United States Patent
Tanigaki et al.

[11] Patent Number: 5,952,013
[45] Date of Patent: Sep. 14, 1999

[54] APPARATUS FOR APPLYING A RESIN LAYER OF VARYING WIDTH TO A METAL MEMBER OF VARYING WIDTH

[75] Inventors: Tsuyoshi Tanigaki, Kariya; Kanehiro Nagata, Nagoya; Hirohisa Kimura, Chiryu; Yoshito Koide, Nagoya, all of Japan

[73] Assignee: Aisin Seiki Kabushiki Kaisha, Kariya, Japan

[21] Appl. No.: 08/982,007

[22] Filed: Dec. 1, 1997

[30] Foreign Application Priority Data

Nov. 29, 1996 [JP] Japan .................................... 8-319684
Nov. 19, 1997 [JP] Japan .................................... 9-318644

[51] Int. Cl.⁶ .......................... B29C 47/06; B29C 47/12; B29C 47/92
[52] U.S. Cl. ...................... 425/113; 425/145; 425/376.1; 425/465
[58] Field of Search .................................... 425/113, 145, 425/376.1, 465

[56] References Cited

U.S. PATENT DOCUMENTS

| | | |
|---|---|---|
| 3,912,436 | 10/1975 | Bailly .................................. 425/465 X |
| 4,340,554 | 7/1982 | Bardwell . |
| 5,190,338 | 3/1993 | Yada . |
| 5,273,704 | 12/1993 | Scholl et al. . |
| 5,492,387 | 2/1996 | Yada et al. . |
| 5,534,316 | 7/1996 | Yada et al. . |

FOREIGN PATENT DOCUMENTS

| | | |
|---|---|---|
| 0 118 397 | 9/1984 | European Pat. Off. . |
| 0 511 871 | 11/1992 | European Pat. Off. . |
| 5-62088 | 9/1993 | Japan . |
| 8-332662 | 12/1996 | Japan . |
| 1073830 | 6/1967 | United Kingdom . |

*Primary Examiner*—Leo B. Tentoni
*Attorney, Agent, or Firm*—Burns, Doane, Swecker & Mathis, LLP

[57] ABSTRACT

An apparatus for applying a resin layer of varying width to a surface portion of a supporting member having a varying width includes a stationary die in which is provided a cavity, a resin passage in the cavity, and an injector disposed at the outlet of the resin passage. An extruder extrudes resin material into the cavity via the resin passage. A sliding shutter mechanism is disposed in the cavity for varying the width-wise extent over which the resin is applied to the surface portion of the supporting member to permit application of a resin layer of varying width to the surface portion of the supporting member. A control unit is connected to the extruder and the shutter mechanism for controlling extrusion of the resin and the position of the shutter within the cavity. A method for applying a resin layer of varying width on the surface of a supporting member having a varying width involves advancing a supporting member in a feed direction into a stationary die, wherein the stationary die has a cavity, a resin passage in the cavity, and a movable shutter mechanism disposed in the cavity. Resin material is extruded into the cavity via the extrusion passage to apply a layer of resin material to the surface of the supporting member. During the extrusion of the resin material and the advancement of the supporting member through the stationary die, the shutter mechanism is moved to vary the width of the resin layer applied to the surface of the supporting member so that the supporting member exiting the stationary die has an applied resin layer of varying width.

11 Claims, 6 Drawing Sheets

APPARATUS FOR APPLYING A RESIN LAYER OF VARYING WIDTH TO A METAL MEMBER OF VARYING WIDTH

The entire disclosure of Japanese Application No. 8-319684 filed on Nov. 29, 1996 and the entire disclosure of Japanese Application No. 9-318644 filed on Nov. 19, 1997 are incorporated herein by reference.

FIELD OF THE INVENTION

The present invention generally relates to an apparatus and method for forming an extrusion member. More particularly, the present invention pertains to an apparatus and method for forming an extrusion member in which a resin layer of gradually changing cross-section or width is formed on a metal member also having a gradually changing cross-section or width.

BACKGROUND OF THE INVENTION

Figure 10:
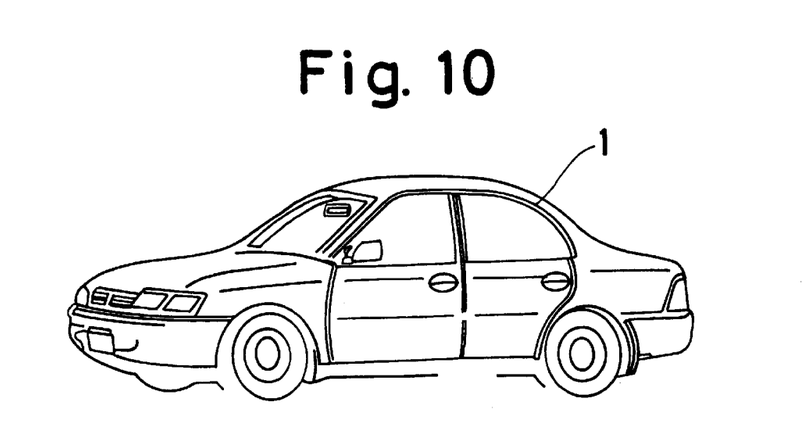
FIG. 10 is a perspective view of a vehicle illustrating a roof drip molding mounted on the vehicle.
Figure 11:
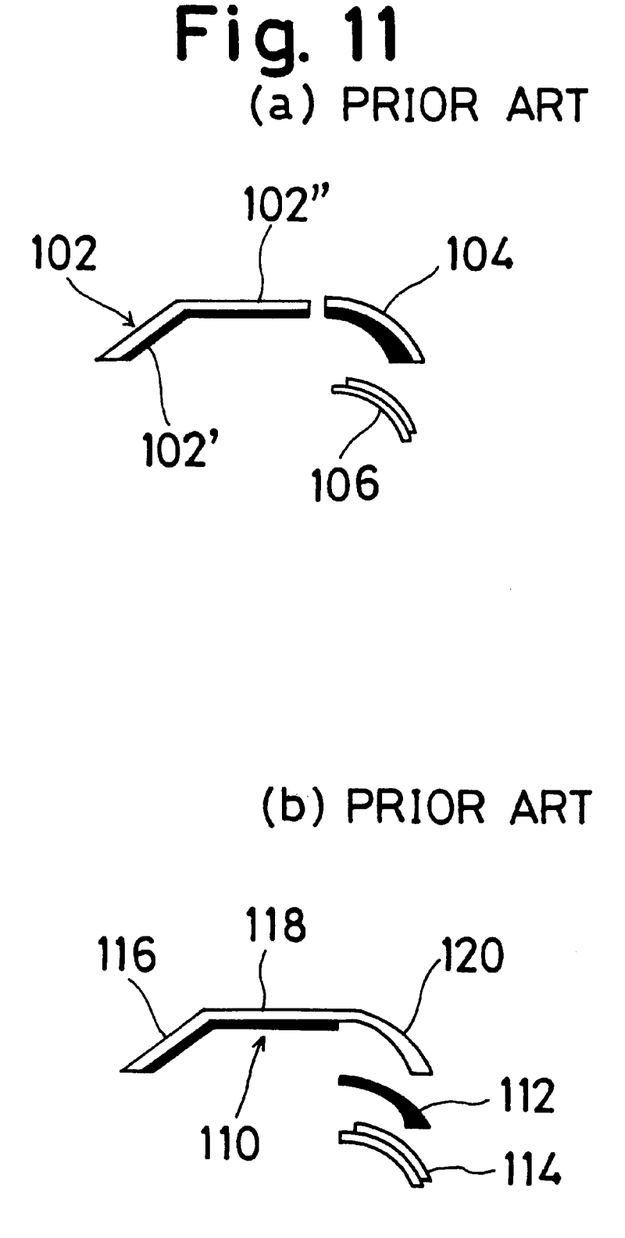
FIG. 11(a) is a plan view of a known roof drip molding.
FIG. 11(b) is a plan view of another known roof drip molding.

As shown in FIG. 10, vehicles typically include a roof drip molding disposed between the vehicle body and the door frame. In the past, this roof drip molding has been manufactured so as to possess a constant cross-section. Recently, in order to improve its design and appearance, the roof drip molding has been manufactured to possess a gradually changing cross-section along a portion of its length. For example, Japanese Patent Publication No. 5-62088 discloses a molding having a gradually changing cross-section and made of a plurality of parts. As seen in FIG. 11(a), the molding includes a main body 102, a garnish or ornamental portion 104, and a retainer 106 which is adapted to provide water sealing characteristics. The main body 102, which possesses a constant cross-section along its length, is formed by rolling a piece of metal, extruding a plastic layer onto the metal piece and then subjecting the main body to a bending operation to bend the front portion 102' relative to the center portion 102" of the main body. A portion of the metal in the main body 102 is exposed to form a shiny part of the molding while the portion of the metal that is covered by the plastic layer forms a non-shiny part of the molding.

The garnish or ornamental portion 104 is formed by stamping a metal piece and then injection molding a plastic layer onto the metal piece. A portion of the metal of the ornamental portion 104 is exposed to form a shiny part that aligns with the shiny part on the main body 102 after assembly, and the remaining portion of the metal piece that is covered with the plastic forms a non-shiny part of the ornamental portion 104. The non-shiny part of the garnish portion 104 possesses a gradually changing cross-section.

The retainer 106 is formed by rolling a piece of metal and then subjecting the metal piece to a bending operation. The garnish 104 and the retainer 106 are then assembled to one another by welding to form a rear portion of the main body. The resulting rear portion of the main body is then assembled with the main body 102 to form the molding. The molding thus possess a front portion and center portion of constant cross-section or width, and a rear portion (formed by the garnish and retainer) having a changing cross-section or width.

This construction of the molding and method of manufacturing the molding suffers from a variety of drawbacks and disadvantages. In one respect, several different parts must be formed to produce the ultimate molding. This method also requires a variety of different process steps, thus increasing the cost and time associated with manufacturing the molding. Further, when the rear portion of the main body is assembled with the remainder of the main body, a seam is formed between the two parts. This seam can have a negative influence on the appearance of the molding and can adversely affect the water sealing capabilities of the molding.

Another known construction of a roof drip molding is illustrated in FIG. 11(b) and includes a main body 110, a garnish or ornamentation portion 112 and a retainer 114. The main body 110 includes a front portion 116, a center portion 118 and a rear portion 120. The main body 110 is formed by rolling a strip of metal and applying a plastic layer along the length of the metal strip through extrusion. The width of the plastic layer is constant throughout the length of the main body and a portion of the metal strip is exposed to provide a shiny part on the main body 110. A portion of the plastic layer in the area of the rear portion of the main body is then removed through appropriate operations and the rear portion 120 of the main body 110 is then bent to produce the main body seen in FIG. 11(b).

The garnish or ornamental portion 112 is formed by injection molding and possesses a changing cross-section or width. The retainer 114 is formed by rolling a piece of metal and subjecting it to a bending operation. The garnish 112 and the retainer 114 are then assembled together, with the resulting piece being welded to the main body 110.

This construction of the molding suffers from drawbacks and disadvantages similar to those discussed above. The numerous parts and operations needed to manufacture the molding significantly increases the cost associated with the molding. Further, the seam that is created by the assembly of the parts can adversely affect the water sealing capabilities of the molding.

SUMMARY OF THE INVENTION

Accordingly, a need exists for an apparatus and method for forming an extrusion member having a gradually changing cross-section defined by a gradually changing shiny portion and a gradually changing non-shiny portion.

A need also exists for an apparatus and method which avoid the problems mentioned above concerning application of a uniform layer of resin.

In light of the foregoing, the present invention provides an apparatus for applying a resin layer of varying width to a surface portion of a supporting member having a varying width. The apparatus includes a stationary die in which is provided a cavity, a resin passage in the cavity, and an injector disposed at the outlet of the resin passage. An extruder is provided for extruding resin material into the cavity via the resin passage. A sliding shutter mechanism is disposed in the cavity for varying the width-wise extent over which the resin is applied to the surface portion of the supporting member to permit application of a resin layer of varying width to the surface portion of the supporting member. A control unit is connected to the extruder and the shutter mechanism for controlling extrusion of the resin and the position of the shutter within the cavity.

The present invention also includes a receiving die that is designed to support the rear side of the supporting member during extrusion of the resin material. In one form of the invention, the receiving die is an eccentric device having a portion of greater width for supporting the rear side of the supporting member during application of a resin layer of relatively greater width and a smaller width portion for supporting the rear side of the supporting member during application of a resin layer of relatively smaller width. In another form of the invention, the receiving die is in the form of a plurality of sliding plates.

According the another aspect of the invention, a method for applying a resin layer of varying width on the surface of a supporting member having a varying width involves advancing a supporting member in a feed direction into a stationary die, wherein the stationary die has a cavity, a resin passage in the cavity, and a movable shutter mechanism disposed in the cavity. Resin material is extruded into the cavity via the extrusion passage to apply a layer of resin material to the surface of the supporting member. During the extrusion of the resin material and the advancement of the supporting member through the stationary die, the shutter mechanism is moved to vary the width of the resin layer applied to the surface of the supporting member so that the supporting member exiting the stationary die has an applied resin layer of varying width.

Another aspect of the invention involves an apparatus for applying a resin layer of varying width to a surface portion of a supporting member having a varying width, wherein the apparatus includes a stationary die in which is provided a cavity, a resin passage, and an injector disposed at an outlet of the resin passage, with the stationary die being provided with an opening through which the supporting member is advanced. An extruder extrudes resin material into the cavity via the resin passage, and a receiving die that is positioned along one side of the opening supports the rear side of the supporting member as the supporting member is advanced through the stationary die and while resin is injected through the injector. The receiving die includes a supporting surface that varies in width. A drive motor is connected to the receiving die for moving the receiving die as the supporting member is advanced through the stationary die to cause the rear side of the supporting member to be supported by different portions of the supporting surface of the receiving die. A control unit connected to the drive motor controls the position of the receiving die so that the width of the portion of the supporting surface of the receiving die supporting the rear side of the supporting member varies as the width of the supporting member to which resin is being applied varies.

BRIEF DESCRIPTION OF THE DRAWING FIGURES

The foregoing and additional features and aspects of the present invention will become more apparent from the following detailed description considered with reference to the accompanying drawing figures in which like elements are designated by like reference numerals and wherein.

DETAILED DESCRIPTION OF THE INVENTION

Figure 1:
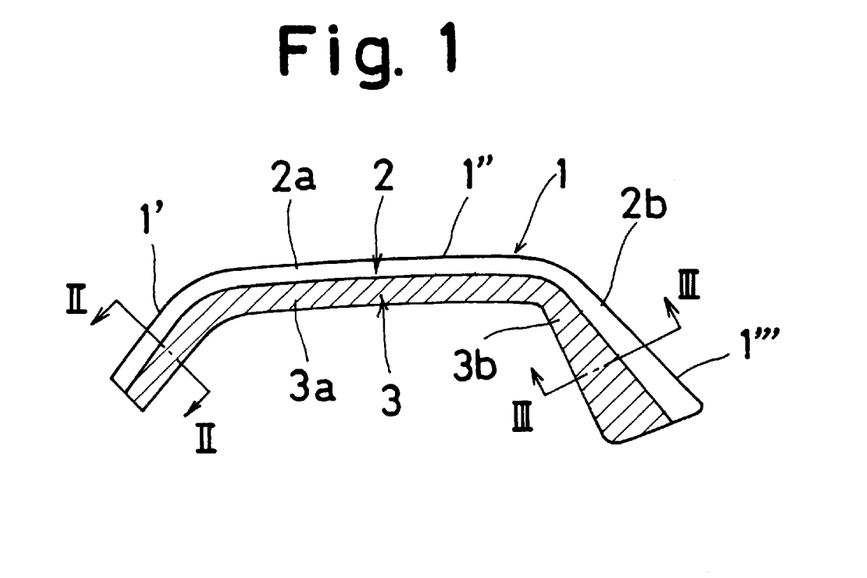
FIG. 1 is a plan view of a roof drip molding according to the present invention.
Figure 2:
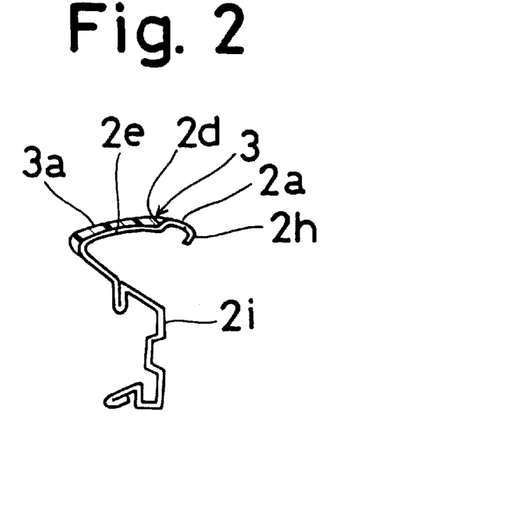
FIG. 2 is a cross-sectional view taken along the section line II—II in FIG. 1.
Figure 3:
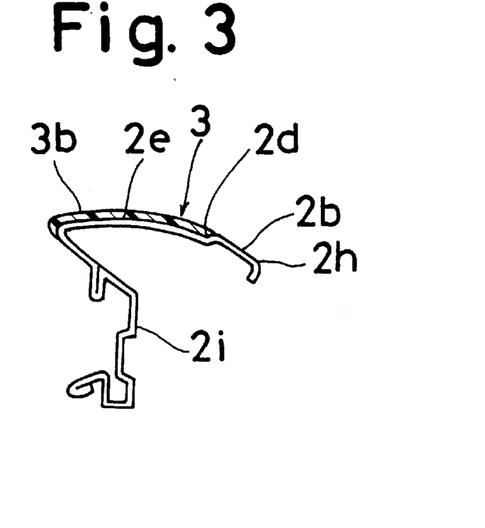
FIG. 3 is a cross-sectional view taken along the section line III—III in FIG. 1.

Referring initially to FIG. 1 which is a front plan view of the roof drip molding according to the present invention, the roof drip molding 1 is defined as a an extrusion member having a gradually changing cross-section or width. The roof drip molding is a one piece unitary member and includes a front molding portion 1', a center molding portion 1" and a rear molding portion 1'". The front and rear molding portions 1', 1'" are bent relative to the center molding portion 1" as shown in FIG. 1. The molding 1 is comprised of a metal or supporting member 2 made from stainless steel (SUS) by a roll forming apparatus and a resin member or layer 3 applied to a portion of the metal member 2 as seen in FIGS. 2 and 3. As described in more detail below, the molding 1 is initially formed as a linear member and is subsequently bent at the front and rear portions through use of a bending machine to form the configuration shown in FIG. 1.

Considering the metal member 2 with respect to its longitudinal extent (i.e., from the left end illustrated in FIG. 1 to the right end illustrated in FIG. 1), the metal member 2 includes a portion 2a having a generally constant cross-section or width and a portion 2b having a changing cross-section or width. The portion 2a of the metal member 2 having a generally constant cross-section or width extends over the front and center portions 1', 1" of the molding while the portion 2b of the metal member 2 having a changing cross-section or width extends over the rear portion 1'" of the molding.

Considering the metal member 2 with respect to its width-wise extent, the metal member 2 includes a resin receiving surface portion 2e that receives the resin member 3, a surface portion 2h that is devoid of the resin member, and a suitably configured retaining portion 2i which is adapted to be fixed to the vehicle body and provide water sealing capabilities. The metal member 2 is bent at a place along its width-wise direction as seen in FIGS. 2 and 3 to form a partially depressed region 2d of the metal member that is depressed relative to the adjacent portion of the metal member. This partially depressed region 2d of the metal member 2 corresponds to the resin receiving surface portion 2e of the metal member 2 that receives the resin layer 3.

Considering the resin layer 3 in the length-wise direction, the resin layer 3 includes a portion 3a of generally constant cross-section or width and another portion 3b of varying cross-section or width. The portion 3a of the resin layer 3 having the generally constant cross-section or width extends over the front and center portions 1', 1" of the molding while the portion 3b of the resin layer 3 having a changing cross-section or width extends over the rear portion 1'" of the molding. As described in more detail below, the resin layer 3, which can be, for example, vinyl-chloride, is applied to the resin receiving surface portion 2e of the metal member 2 in the depressed region 2d by an extruder.

The portion of the molding to which the resin layer 3 is applied constitutes a non-shiny part of the molding while the portion of the metal member 2 not covered by the resin layer constitutes a shiny part of the molding.

Figure 4:
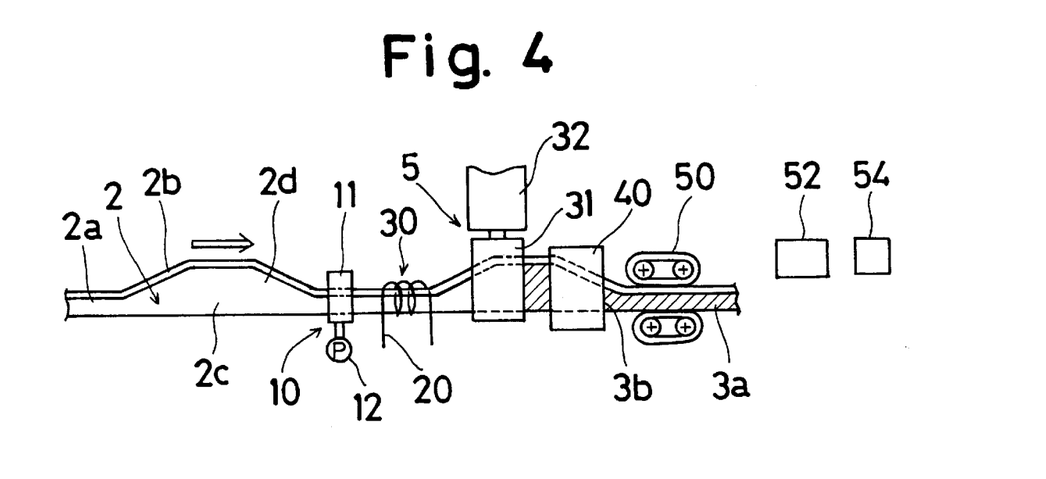
FIG. 4 is a schematic illustration of the manufacturing method according to the present invention for manufacturing an extrusion member or roof drip molding in accordance with the present invention.

Generally speaking, the method of manufacturing the molding 1 shown in FIGS. 1–3 involves a series of steps that are schematically illustrated in FIG. 4. Initially, a metal strip 2' (e.g. SUS) which is rolled in a roll-shaped is cut in a width-wise direction by a cutting machine to form a continuous metal strip defining a plurality of successively arranged metal members 2. That is, the metal strip is formed to have a series of longitudinally arranged portions 2a of generally constant cross-section or width each separated by a portion 2b of varying cross-section or width. This alternating serial arrangement of portions 2a having a generally constant cross-section or width and portions 2b having a varying cross-section or width continues along the longitudinal extent of the metal strip 2'. As described below, after the resin material is applied to the metal strip, the metal strip 2' with the applied resin layer is cut at specified places along the length of the strip to form a plurality of moldings which are then subsequently bent to form a plurality of the moldings shown in FIG. 1. The metal strip 2' moves to the right in the feeding direction as seen with reference to FIG. 4 by a driving roller (not shown). The metal strip can be planar in which case an appropriate mechanism is provided in the schematic set-up shown in FIG. 4 to form the depressed region 2d on the surface of the metal strip 2'. Alternatively, the metal strip can be bent prior to placement in the schematically illustrated set-up shown in FIG. 4 so as to have the depressed regions 2d.

As the metal strip 2' is advanced in the direction of the arrow shown in FIG. 4, an adhesive material is applied to the depressed regions 2d on the metal strip 2' by an adhesive applying apparatus 10. The adhesive applying apparatus 10 includes an adhesive applying member 11 which can be in the form of a sponge material, a felt material or the like, and a pump 12 which pumps out the adhesive for application to the depressed region 2d of the metal strip.

The depressed region 2d of the metal strip with the applied adhesive is then heated by a high frequency coil 20 to heat the adhesive. Resin material 3, which can be vinyl-chloride or other resin material, is extruded on the depressed region 2d of the metal strip by an extruder 32. The resin material 3 from the extruder 32 is conveyed by a resin passage in a stationary die 31 and is led to an injector 23 of the stationary die 31. A resin layer is thus formed on the depressed region 2d of the metal strip.

Continued advancement of the metal strip 2' in the direction of the arrow in FIG. 4 moves the metal strip with the applied resin to a cooling apparatus 40. The cooling apparatus 40 effects cooling and thus solidification of the resin on the metal strip. Thereafter, the metal strip 2' with the applied layer of cooled resin is extracted by an extracting machine 50 to a cutting machine 52 schematically illustrated in FIG. 4 where the metal strip 2' is cut at predetermined intervals to form linear lengths of molding. The linear lengths of molding are then bent in three dimensions by a bending machine 54 schematically illustrated in FIG. 4 to form individual roof drip moldings corresponding to the roof drip molding shown in FIG. 1.

Figure 5:
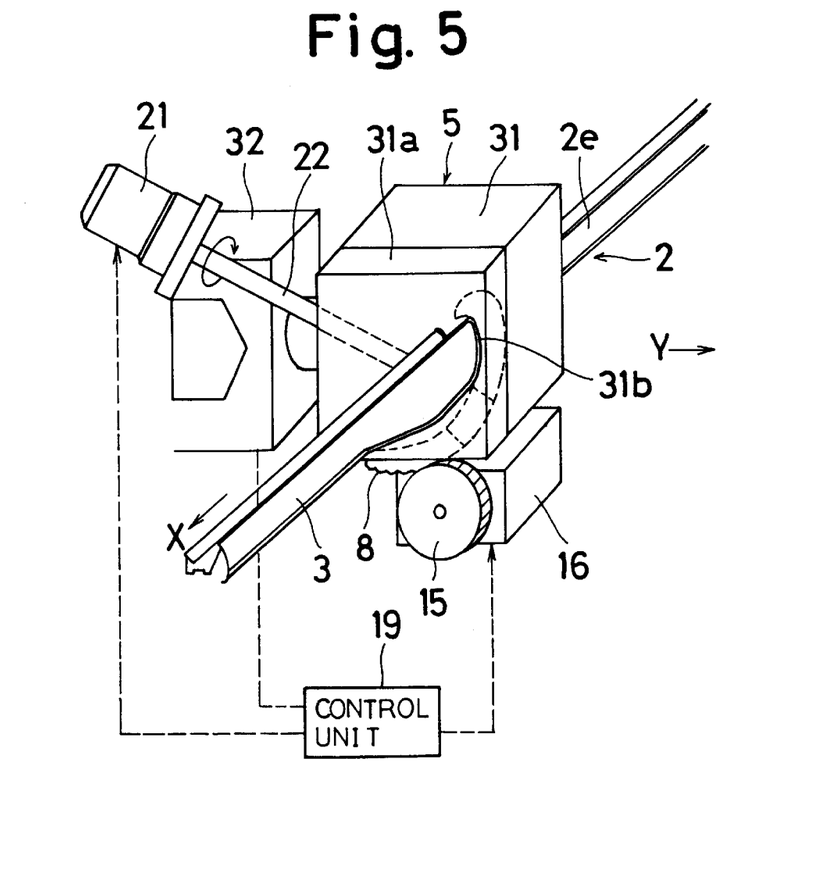
FIG. 5 is a perspective view of an apparatus for forming an extrusion member of gradually changing cross-section or width according to the present invention.
Figure 6:
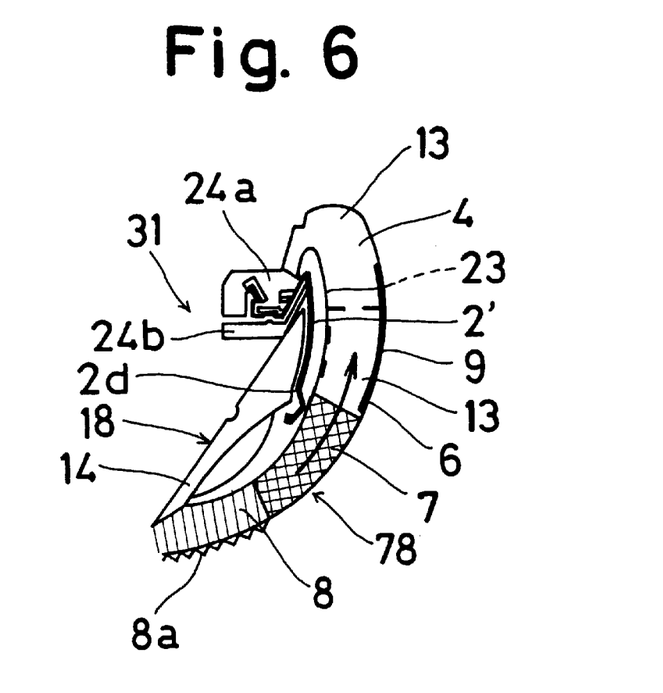
FIG. 6 is an enlarged cross-sectional view of a portion of the apparatus illustrated in FIG. 5.

FIGS. 5 and 6 illustrate the details associated with the apparatus 5 for forming a resin layer on the metal strip 2'. This apparatus is defined as a gradually changing extrusion forming apparatus 5. The apparatus includes the stationary die 31 and the extruder 32. The stationary die 31 is provided with a resin passage 6 (depicted by a bold line) and a cavity 13 having an arcuate shape as seen in FIG. 6. An injector 23, whose position is generally illustrated in FIG. 6, is disposed in communication with the cavity 13 and is positioned adjacent the metal strip 2'. The extruder 32 extrudes resin material 3 into the cavity 13 through the resin passage 6. A forming die 31a, which is connected to the stationary die 31 by way of bolts, has an opening 31b through which the metal strip 2' is conveyed.

A shutter mechanism 78 is positioned in the cavity 13 in the stationary die 31. The shutter mechanism 78 includes an arcuate shaped shutter 7 and a variable die 8 which is fixed to the shutter 7. The shutter mechanism 78 is designed to slide along the cavity 13 and restrain the extrusion volume (i.e., the amount of resin material) extruded from the injector 23 so as to conform to the width or shape of the depressed region 2d or resin receiving surface 2c on the metal strip. A receiving die mechanism 18 receives resin pressure at the rear side of the metal strip 2' and supports the rear side of the metal strip when resin material 3 is injected through the injector 23. The receiving die mechanism 18 is positioned in opposing relation to the shutter mechanism 78 and on the opposite side of the metal strip from the shutter mechanism 78.

The shutter mechanism 78 is moved by a driving apparatus 16 while the receiving die mechanism 18 is rotated by a driving motor 21. The extruder 32, the driving apparatus 16 of the shutter mechanism 78, and the driving motor 21 of the receiving die mechanism 18 are connected to and controlled by a control unit 19. The extruder 32, the driving motor 21, the driving apparatus 16, and the stationary die 31 are fixed on a base member (not shown) so as to be adjusted to predetermined positions.

According to the preferred embodiment illustrated in FIGS. 5 and 6, the shutter mechanism 78 defined by the shutter 7 and the variable die 8 is formed as two separate elements. However, the shutter mechanism 78 comprised of the shutter 7 and the variable die 8 may be made as a single unit.

As seen in FIG. 5, the metal strip 2' is supported by the stationary die 31 which includes upper and lower fixed stationary dies 24a, 24b, at least one of which is fixed to the stationary die 31.

The resin material forming the resin layer 3 on the metal strip is mixed and kneaded by a screw (not shown) which is disposed in a cylinder bore (not shown) of the extruder 32. By varying the rotation speed of a screw which is disposed in the cylinder bore, it is possible to vary the amount of resin material extruded by the extruder 32. The resin material flows from the extruder 32 in the X direction via the Y direction through the resin passage 6 of the stationary die 31. Then the flow direction of the resin material changes to the -Y direction in the cavity 13, and the resin material is then extruded from the injector 23 toward the depressing portion 2d of the metal strip.

The movable shutter 7 functions to provide a variable resin capacity in the cavity 13 by sliding along the cavity 13. The movement of the shutter 7 adjusts the amount of opening/closing area of the injector 23 so as to adjust the width of the resin layer 3 that is applied to the depressed region 2d or resin receiving surface portion 2e of the metal strip 2'. More specifically, the shutter 7 restricts the opening/closing area of the injector 23 so that the degree of opening of the injector corresponds to the width of the depressed region or resin receiving surface portion 2e of the metal strip.

The output shaft of the driving apparatus 16 of the shutter mechanism 78 is connected to a rotating gear 15. The rotating gear 15 meshes with a gear surface 8a formed on the periphery of the variable die 8. The shutter 7 is designed to move in a generally circumferential direction through the engagement of the rotating gear 15 with the gear surface 8a of the variable die 8. The control unit 19 is connected to the driving apparatus 16 to control the operation of the driving apparatus. The operation of the driving apparatus 16 and the engagement of the gear surface 8a of the variable die 8 with the rotating gear 15 causes the variable die 8 to move along the cavity 13. As a result, the shutter 7, which is fixed to the variable die 8 (e.g., by bolts), moves within the cavity 13 to change the amount of opening/closing of the outlet of the injector 23 so that the degree of opening/closing of the outlet of the injector 23 corresponds to the shape or width of the resin receiving surface portion 2e of the metal strip 2'. The solid line position of the shutter 7 shown in FIG. 6 represents the position of the shutter 7 when the resin layer 3 is the maximum width (i.e., in the region 3b of the resin layer as seen in FIG. 3), and the dotted line position of the shutter 7 shown in FIG. 6 represents the position of the shutter 7 when the resin layer 3 is the minimum width (i.e., in the region 3a of the resin layer as seen in FIG. 2).

As noted above, the receiving die mechanism 18 is disposed at the rear side of the metal strip 2'. That is, the receiving die mechanism 18 is located on the side of the metal strip that is opposite the side receiving the resin pressure. The receiving die mechanism 18 is designed to restrain the metal strip 2' as it is subjected to the resin pressure during application of the resin layer 3 to the resin receiving surface portion 2e of the metal strip.

Figure 7:
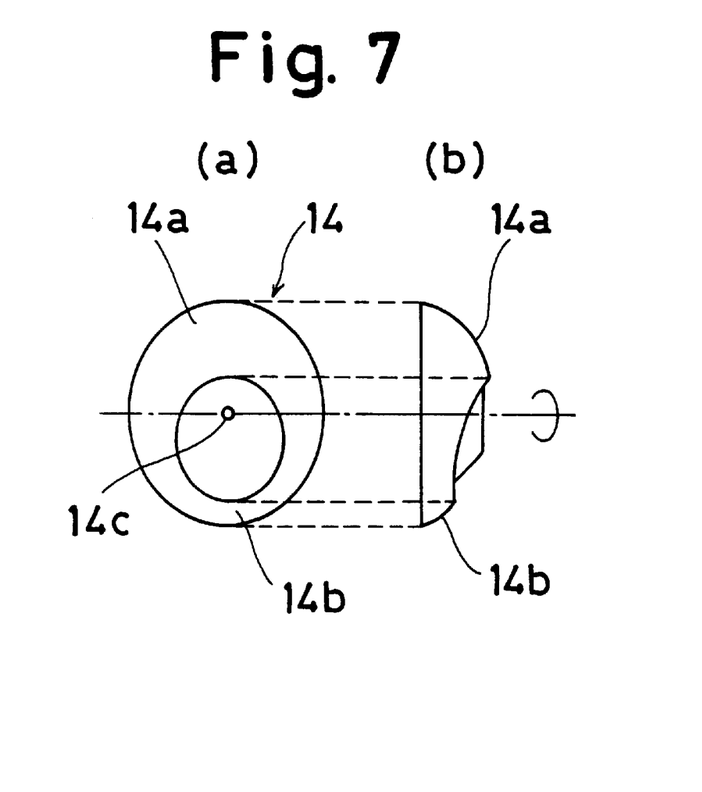
FIG. 7(a) is a plan view of a receiving die used in the apparatus according to the present invention.
FIG. 7(b) is a side view of the receiving die shown in FIG. 7(a)

One form of the receiving die mechanism 18 shown in FIGS. 7(a), 7(b) and 9(b) is a rotating type receiving die mechanism. In the case of this rotating type receiving die mechanism shown in FIGS. 7(a) and 7(b), a receiving die 14 in the form of a generally hemispherical die is provided. The receiving die 14 has an eccentric cam supporting surface defined by a supporting surface portion 14a of large width which is adapted to correspond to the maximum width region of the resin receiving surface portion of the metal sheet (i.e., the portion of the metal sheet in the region 3b shown in FIG. 3) and a supporting surface portion 14b of small width which is adapted to correspond to the minimum width region of the resin receiving surface portion of the metal sheet (i.e., the portion of the metal sheet in the region 3a shown in FIG. 2). The width of the supporting surface on the receiving die 14 gradually changes from the large width portion 14a to the small width portion 14b as seen in FIG. 7(a).

Figure 8:
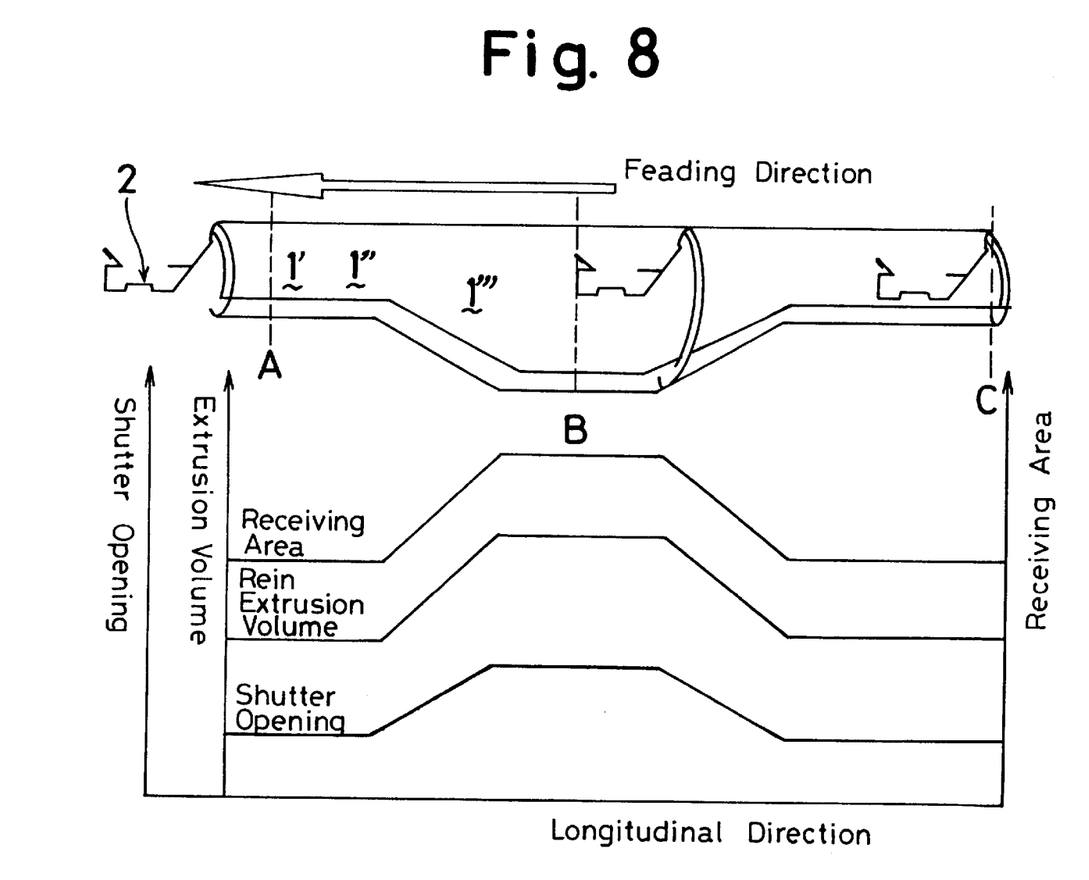
FIG. 8 is a schematic timing chart of the control unit used in the present invention.

The receiving die 14 is rotated by a driving motor 21 whose operation is controlled by the control unit 19. An output shaft 22 of the driving motor 21 is connected to the center 14c of the receiving die 14. The operation of the driving motor 22 causes the receiving die 14 to rotate to bring different portions of the supporting surface of the receiving die 14 into supporting and contacting relation with respect to the rear surface of the metal strip 2'. That is, as seen in FIG. 8, the metal strip in region A of its longitudinal dimension possesses its minimum width, while in the region B of its longitudinal dimension the metal strip possesses its maximum width. As the region A of the metal strip 2' having the minimum width passes through the stationary die 31, the receiving die mechanism 18 is positioned such that the small width portion 14b of the die 14 is located in a supporting position against the rear side of the metal strip. The metal strip 2' is thus supported by the stationary die 24 and/or the small width portion 14b of the receiving die 14. As the metal strip 2' moves through the stationary die so that the maximum width region B of the metal strip is positioned to have resin material applied thereto, the receiving die mechanism 18 is rotated to move the large width portion 14a of the receiving die 14 to a supporting position against the rear side of the metal strip. The receiving die 14 is thus adapted to support the rear side of the metal strip along the resin receiving surface portion 2e of the metal strip.

Thus, as the width of the resin receiving portion 2e that is located in the stationary die changes as a result of the metal strip 2' being advanced in the direction X shown in FIG. 5, the receiving die mechanism 18 is operated to cause the receiving die 14 to be rotated between a first position to a second position. In the first position of the receiving die 14, which takes place when the minimum width region A of the metal strip is located in the stationary die 31, the small width portion 14b of the receiving die supports the minimum width region A of the metal strip. In the second position of the receiving die 14, which takes place when the maximum width region B of the metal strip 2' is located in the stationary die 31, the large width portion 14a of the receiving die 14 supports the maximum width region B of the 2'. By supporting the metal strip 2' in this manner, it is possible to form a uniform layer of resin material on the metal strip 2' over the desired width of the 2'.

Figure 9:
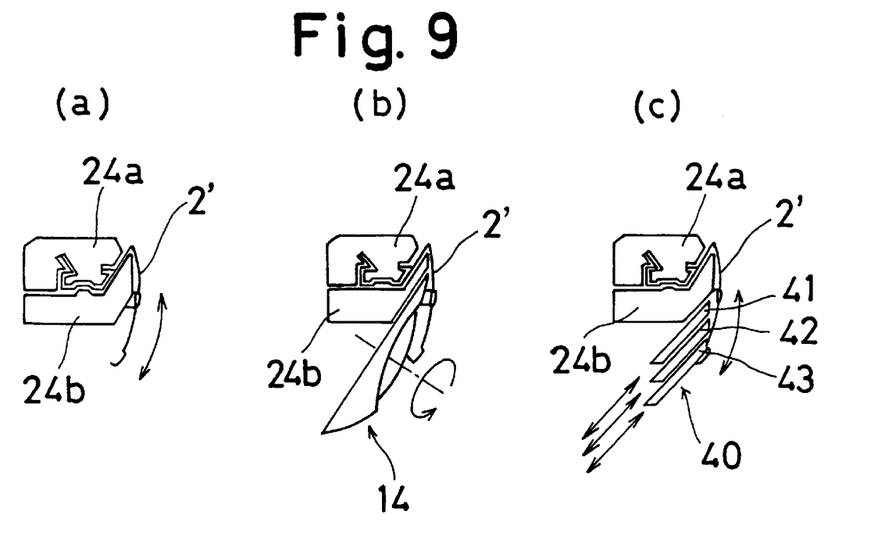
FIG. 9(a) is a partial cross-sectional view of the upper and lower stationary dies supporting the metal strip.
FIG. 9(b) is a partial cross-sectional view of the upper and lower stationary dies supporting the metal strip and illustrating the rotating receiving die.
FIG. 9(c) is a partial cross-sectional view of the upper and lower stationary dies supporting the metal strip and illustrating the sliding receiving die.

With reference to FIG. 9 (a), if the receiving die 14 is not provided to support the metal strip and resist the force of the resin pressure, the force of the resin pressure acts upon and moves the metal strip, thus making it difficult to form a uniform resin layer on the metal strip at the necessary place.

Referring to FIG. 8, the operational control performed by the control unit 19 will be described. The control unit 19 controls the amount of resin material extruded by controlling the rotation of the screw of the extruder 32. The control unit 19 also controls the opening/closing degree of the shutter 7 through operational control of the driving apparatus 16, and controls the position of the receiving die through operational control of the driving motor 21. As the metal strip 2' is conveyed through the stationary die 31 with the minimum width region A of the metal strip 2' being located in the stationary die 31 so as to have a resin layer applied thereto, the receiving die 14 is positioned so that the small width portion 14b supports the rear side of the metal strip 2' along the minimum width region A of the metal strip 2'. At the same time, the movable shutter is located in the dotted line position shown in FIG. 6 so that degree of opening of the injector 23 generally corresponds to the width of the resin receiving surface portion of the metal strip 2' in the minimum width region A of the metal strip 2'. Thus, a resin layer is applied to the metal strip 2' over a width corresponding to the width of the resin receiving surface portion of the metal strip 2' in the minimum width region A of the metal strip 2'. This portion of the resin layer 3 corresponds to the constant width or cross-section portion 3a shown in FIG. 2. A resin layer of constant width is thus applied to the metal strip 2' throughout the portion of the longitudinal extent of the metal strip 2' that is of constant width.

As the metal strip 2' continues to be advanced in the feeding direction (i.e., the X direction shown in FIG. 5 and the direction indicated by the arrow in FIG. 1), the width of the region of the metal strip 2' located in the stationary die 31 gradually increases (i.e., from the minimum width region A to the maximum width region B). As this occurs, the control unit 19 will effect operational control of the extruder 32 and the driving apparatus 16 so that the rotation of the screw of the extruder 32 and the degree of opening of the shutter 7 gradually increase. At the same time, the control unit 19 effects operational control of the driving motor 21 of the receiving die mechanism 18 so that the receiving die 14 is gradually rotated from the first position in which the rear side of the metal strip 2' is supported by the small width portion 14b of the receiving die to the second position in which the rear side of the metal strip 2' is supported by the large width portion 14a of the receiving die 14. As the shutter 7 moves towards the full line position shown in FIG. 6, the width of the resin layer that is applied to the metal strip 2' gradually increases in correspondence to the gradually increasing width of the depressed region 2d (resin receiving surface portion 2e) of the metal strip 2'. The gradually increasing width of the metal strip 2' is supported by the gradually increasing supporting width of the receiving die 14 as the resin is injected and applied to the depressed region 2d (resin receiving surface portion 2e) of the metal strip 2'. As a result, the portion 3b of the resin having a varying cross-section or width is applied to the portion 2b of the metal strip 2' having a varying cross-section or width. This results in the production of the rear portion 1''' of the molding having a varying cross-section or width.

When the metal strip 2' is advanced to a point where the maximum width region B of the metal strip is located within the stationary die 31, the shutter 7 will be located in the full line position shown in FIG. 6 and the receiving die will be located at the position shown in FIG. 6 in which the rear side of the maximum width region B of the metal strip 2' is supported by the maximum width portion 14a of the receiving die 14. A resin layer will thus be applied over the depressed region 2d (the resin receiving surface portion 2e) in the maximum width region of the metal strip 2'.

As the metal strip 2' continues to be advanced in the feeding direction shown in FIG. 8 (i.e., in the X direction shown in FIG. 5 and in the direction indicated by the arrow in FIG. 1), the width of the portion of the metal strip 2' located in the stationary die will gradually decrease from the maximum width region B shown in FIG. 8 to the minimum width region C. As this occurs, the control unit will effect operational control of the extruder 32 and the driving apparatus 16 so that the rotation of the screw associated with the extruder and the degree of opening of the shutter 7 are gradually reduced. At the same time, the receiving die 14, through operational control of the driving motor 21 by the control unit 19, will be gradually rotated so that the portion of the receiving die 14 which supports the metal strip 2' gradually shifts from the large width portion 14a to the small width portion 14b to thereby correspond to the changing width of the depressed region 2d (resin receiving surface portion 2e) of the metal strip 2'. Thus, the depressed region 2d or resin receiving surface portion 2e of the metal strip 2' is continuously supported by the receiving die 14 to ensure application of a uniform layer of resin to the depressed region 2d (resin receiving surface portion 2e) of the metal strip 2'.

Continued advancement of the metal strip 2' in the feeding direction shown in FIG. 8 eventually results in the minimum width portion C of the metal strip 2' being located in the stationary die 31. At this point, the operation control effected by the control unit 19 will cause the receiving die 14 to be located in the first position in which the small width portion 14b of the supporting surface is positioned in supporting relation to the rear side of the metal strip 2' over a width substantially corresponding to the width of the depressed region 2d (resin receiving surface portion 2e) in the minimum width region of the metal strip 2'. At the same time, the control unit 19 will control the screw associated with the extruder 32 and the driving apparatus 16 associated with the shutter 7. The shutter 7 will thus be moved to the dotted line position shown in FIG. 6 and the extruder 32 will extrude an appropriate amount of resin necessary to apply a resin layer to the depressed portion 2d (resin receiving surface portion 2e) of the metal strip 2' in the minimum width region C of the metal strip 2'.

The process described above continues as the metal strip 2' is continuously advanced through the stationary die 31. A resin layer is thus applied in a continuous fashion to the metal strip 2', with the width of the applied resin layer varying in correspondence to changes in the width of the metal strip 2'.

As noted above in connection with the discussion regarding the overall process schematically illustrated in FIG. 4, once the resin layer has been applied to the metal strip 2', the metal strip with the applied resin layer is cut into individual discreet lengths, each corresponding to one of the lengths of molding 1 shown in FIG. 1. In accordance with the present invention, it is possible to produce individual moldings for both the left side and right side of the vehicle. In this regard, the metal strip 2' with the applied resin layer can be cut in the general vicinity of the regions A, B and C shown in FIG. 8. The portion of the metal strip 2' with the applied resin layer located between regions A and B would be used on the right side of the vehicle while the portion of the metal strip 2' with the applied resin layer located between regions B and C would be used on the left side of the vehicle. It is this possible with the present invention to produce moldings for both the left side and right side of the vehicle through use of a continuous process that applies a resin layer to a metal strip 2', wherein the moldings each have a portion of constant width or cross-section and a portion of varying width or cross-section.

Once the metal strip 2' with the applied resin layer has been cut into individual moldings each having a discreet length, the individual moldings are bent into the final shape shown in FIG. 1. That is, each molding is bent to form front and rear portions that are bent relative to the central portion so that the front and central portions of the molding possess a constant width or cross-section while the rear portion possesses a varying width or cross-section.

As described above, the receiving die mechanism 18 can be in the form of a rotating receiving die. Another possible form of the receiving die mechanism is a sliding type receiving die mechanism. An example of this sliding type of receiving die mechanism is shown in FIG. 9(c). The sliding type of receiving die mechanism includes a receiving die 40 that consists of a plurality of sliding plate members 41, 42, 43 that are movable from an extended position shown in FIG. 9(c) in which they all contact and support the rear side of the metal strip 2' to a retracted position in which less than all of them contact and support the metal strip 2'. The sliding movement of the plate members 41, 42, 43 can be controlled in any suitable manner such as through the use of moving cams that are operatively connected to the motor 21. By moving the plate members 41, 42, 43 in a controlled fashion, the rear side of the portion of the metal strip 2' to which resin is being applied can be appropriately supported in a manner similar to that described above with respect to the receiving die 14.

Thus, for instance, as the metal strip 2' is conveyed through the stationary die 31 with the minimum width region A of the metal strip 2' being located in the stationary die 31 so as to have a resin layer applied thereto, the control unit 19 can position the plate member 41 so that it supports the rear side of the depressed region 2d (resin receiving surface portion 2e) of the metal strip 2' along the minimum width region A of the metal strip 2'. At the same time, the other plate members 42, 43 would be located in the retracted position. The control unit 19 will also control the driving apparatus 16 to position the shutter 7 in the dotted line position shown in FIG. 6 and control the screw associated with the extruder 32 to control the amount of resin extruded through the injector 23.

As the metal strip 2' is advanced in the feeding direction (i.e., the X direction shown in FIG. 5 and the direction indicated by the arrow in FIG. 1), the width of the region of the metal strip 2' located in the stationary die 31 gradually increases (i.e., from the minimum width region A to the maximum width region B). As this occurs, the control unit 19 will effect operational control of the extruder 32 and the driving apparatus 16 so that the rotation of the screw of the extruder 32 and the degree of opening of the shutter 7 gradually increase. At the same time, the control unit 19 would effect operational control of the driving motor associated with the receiving die 40 to cause the plate member 42 to move into contacting and supporting position on the rear side of the portion of the metal strip 2' to which resin is being applied. By the time the metal strip 2' is positioned so that the maximum width portion B of the metal strip is located in the stationary die 31, the plate member 43 would also be moved to the extended position in contacting and supporting relation to the rear side of the portion of the metal strip 2' to which resin is being applied. At this point, all of the plate members 41, 42, 43 would be in the position shown in FIG. 7(c).

As the metal strip 2' is advanced further, the above described process would be reversed, with the positions of the plate members 41, 42, 43, the position of the shutter 7 and the operation of the screw associated with the extruder 32 being controlled in a manner similar to that described above in connection with the use of the receiving die mechanism 18.

The present invention thus provides a method and apparatus for forming an extrusion member, specifically a vehicle roof drip molding, that is a one piece unitarily formed member. It is thus not necessary to form several different pieces which must then be connected together. This not only reduces the manufacturing time and costs, but also results in the production of a molding that is capable of maintaining a water tight seal as it does not possess any seams. Further, the method and apparatus of the present invention make it possible to apply a plastic or resin layer in both a varying width and a constant width to a metal strip 2', and to apply such resin layer in a uniform manner.

The principles, preferred embodiments and modes of operation of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. An apparatus for applying a resin layer of varying width to a surface portion of a supporting member having a varying width comprising:

a stationary die in which is provided a cavity, a resin passage in the cavity, and an injector disposed at an outlet of the resin passage, the stationary die including an opening through which a supporting member is advanced, the supporting member having a surface portion to which a resin layer is to be applied;

an extruder for extruding resin material into the cavity via the resin passage;

a sliding shutter mechanism disposed in the cavity for varying a width-wise extent over which the resin is applied to the surface portion of the supporting member to permit application of a resin layer of varying width to the surface portion of the supporting member; and a control unit connected to the extruder and the shutter mechanism for controlling extrusion of the resin and the position of the shutter within the cavity.

2. The apparatus according to claim 1, wherein the shutter mechanism includes a shutter and a variable die that are separate from one another.

3. The apparatus according to claim 2, including a driving apparatus connected to the shutter mechanism for moving the shutter.

4. The apparatus according to claim 1, including a receiving die positioned within the stationary die in opposing relation to the shutter mechanism for supporting a rear side of the supporting member opposite the surface portion to which the resin layer of varying width is applied.

5. The apparatus according to claim 4, including a driving motor connected to the receiving die for operating the receiving die.

6. The apparatus according to claim 4, wherein the receiving die includes an eccentric cam surface.

7. The apparatus according to claim 6, wherein the eccentric cam surface on the receiving die includes a portion of relatively greater width and a portion of relatively smaller width, the portion of the eccentric cam surface of relatively greater width being adapted to be positioned in supporting relation to the rear side of the supporting member during application of the resin layer over a relatively greater width of the surface portion of the supporting member, the portion of the eccentric cam surface of relatively smaller width being adapted to be positioned in supporting relation to the rear side of the supporting member during application of the resin layer over a relatively smaller width of the surface portion of the supporting member.

8. The apparatus according to claim 7, including a driving motor connected to the receiving die to rotate the receiving die between a first position in which the portion of the cam surface of relatively greater width is positioned in supporting relation to the rear side of the supporting member during application of the resin layer over a relatively greater width of the surface portion of the supporting member, and a second position in which the portion of the cam surface of relatively smaller width is positioned in supporting relation to the rear side of the supporting member during application of the resin layer over a relatively smaller width of the surface portion of the supporting member.

9. The apparatus according to claim 4, wherein the receiving die includes a plurality of movable slide plates, at least some of the slide plates being movable towards the supporting member into supporting relation to the rear side of the supporting member and away from the supporting member out of supporting relation to the rear side of the supporting member.

10. An apparatus for applying a resin layer of varying width to a surface portion of a supporting member having a varying width comprising:

a stationary die in which is provided a cavity, a resin passage in the cavity, and an injector disposed at an outlet of the resin passage, the stationary die including an opening through which a supporting member is advanced, the supporting member having a surface portion to which a resin layer is to be applied and a rear side opposite the surface portion, the surface portion of the supporting member varying in width;

an extruder for extruding resin material into the cavity via the resin passage;

a receiving die positioned along one side of the opening to support the rear side of the supporting member as the supporting member is advanced through the stationary die and as resin is injected through the injector, the receiving die including a supporting surface that varies in width;

a drive motor connected to the receiving die for moving the receiving die as the supporting member is advanced through the stationary die to cause different portions of the supporting surface of the receiving die to support the rear side of the supporting member; and a control unit connected to the drive motor for controlling the position of the receiving die so that the width of the portion of the supporting surface of the receiving die supporting the rear side of the supporting member varies as the width of the supporting member to which resin is being applied varies.

11. The apparatus according to claim 10, including a movable shutter mechanism disposed in the cavity for varying a width-wise extent over which the resin is applied to the surface portion of the supporting member.

* * * * *